(12) United States Patent
Pfab

(10) Patent No.: US 9,394,839 B2
(45) Date of Patent: Jul. 19, 2016

(54) COMBUSTION ENGINE AND METHOD FOR OPERATING A COMBUSTION ENGINE WITH DISCHARGE OF CONDENSATION WATER FROM THE INDUCTION TRACT

(75) Inventor: Christian Pfab, Neckarsulm (DE)

(73) Assignee: AUDI AG, Ingolstadt (DE)

( * ) Notice: Subject to any disclaimer, the term of this patent is extended or adjusted under 35 U.S.C. 154(b) by 201 days.

(21) Appl. No.: 14/114,375

(22) PCT Filed: Apr. 19, 2012

(86) PCT No.: PCT/EP2012/001680
§ 371 (c)(1),
(2), (4) Date: Oct. 28, 2013

(87) PCT Pub. No.: WO2012/146357
PCT Pub. Date: Nov. 1, 2012

(65) Prior Publication Data
US 2014/0048050 A1 Feb. 20, 2014

(30) Foreign Application Priority Data
Apr. 29, 2011 (DE) .......................... 10 2011 018 958

(51) Int. Cl.
*F02D 41/00* (2006.01)
*F02B 29/04* (2006.01)
(Continued)

(52) U.S. Cl.
CPC ........ *F02D 41/0007* (2013.01); *F02B 29/0418* (2013.01); *F02B 29/0468* (2013.01); *F02B 29/0493* (2013.01); *F02M 35/1038* (2013.01); *F02B 37/00* (2013.01); *Y02T 10/146* (2013.01)

(58) Field of Classification Search
CPC ............. F02B 29/0468; F02B 29/0481; F02B 29/0462; F02B 29/0418; F02B 29/0493; F02B 37/00; F02D 41/0007; F02M 35/1038; Y02T 10/146
USPC ............ 123/568.12, 559.1, 542, 563; 60/599, 60/600
See application file for complete search history.

(56) References Cited

U.S. PATENT DOCUMENTS 2,935,978 A * 5/1960 McMeekin et al. ........... 123/563
6,817,197 B1 * 11/2004 Padfield ....................... 62/176.6
(Continued)

FOREIGN PATENT DOCUMENTS

AT        508 010 A4     10/2010
DE     198 52 766 A1     5/2000
(Continued)

OTHER PUBLICATIONS

International Search Report issued by the European Patent Office in International Application PCT/EP2012/001680 on Aug. 3, 2012.

*Primary Examiner* — Stephen K Cronin
*Assistant Examiner* — Susan E Scharpf
(74) *Attorney, Agent, or Firm* — Henry M. Feiereisen LLC

(57) ABSTRACT

A method for operating a combustion engine comprising charging and charge air cooling, wherein in a critical operating state the charge air volume flow through a charge air cooler is adjusted and/or temporally changed by means of at least one charge air cooler valve in such a manner that condensation water present in the charge air cooler and/or in the subsequent induction tract is fed only in harmless quantities successively into the combustion chamber and is thus discharged. The invention further relates to a combustion engine that can be operated according to the method.

10 Claims, 2 Drawing Sheets

(51) Int. Cl.
*F02M 35/10* (2006.01)
*F02B 37/00* (2006.01)

(56) References Cited

U.S. PATENT DOCUMENTS

| | | | |
|---|---|---|---|
| 7,007,680 B2 * | 3/2006 | Tussing et al. | 123/568.12 |
| 7,100,584 B1 | 9/2006 | Bruestle et al. | |
| 7,163,005 B2 * | 1/2007 | Tussing et al. | 123/568.12 |
| 7,530,336 B2 * | 5/2009 | Brecheisen, II | 123/25 A |
| 7,886,724 B2 | 2/2011 | Tai et al. | |
| 8,136,513 B2 | 3/2012 | Schiestl et al. | |
| 2003/0114978 A1 | 6/2003 | Rimnac et al. | |
| 2010/0077995 A1 * | 4/2010 | Buia et al. | 123/542 |
| 2011/0000469 A1 | 1/2011 | Lauberts et al. | |
| 2011/0094219 A1 * | 4/2011 | Palm | 60/599 |

FOREIGN PATENT DOCUMENTS

| | | |
|---|---|---|
| GB | 1 255 956 A | 12/1971 |
| WO | WO 2007/097750 A1 | 8/2007 |
| WO | WO 2009/002233 A1 | 12/2008 |

* cited by examiner

| Operating states | Charge air | Ambient Temperature | Condensate formation | Ice formation | Bypass valve | Charge air cooler valve |
|---|---|---|---|---|---|---|
| A | Fresh air with re-circulated exhaust gas | > 5°C | low | - | closed | open |
| B* | | 0° to 5°C | high | low | regulated | regulated |
| C | | < 0°C | very high | very high | open | closed |
| D | Fresh air with high relative humidity | >5°C | None to low | - | closed | open |
| E* | | 0° to 5°C | medium | low | regulated | regulated |
| F | | < 0° C | high | high | open | closed |

\* critical operating state

Fig. 2

COMBUSTION ENGINE AND METHOD FOR OPERATING A COMBUSTION ENGINE WITH DISCHARGE OF CONDENSATION WATER FROM THE INDUCTION TRACT

CROSS REFERENCES TO RELATED APPLICATIONS

This application is the U.S. National Stage of International Application No. PCT/EP2012/001680, filed Apr. 19, 2012, which designated the United States and has been published as International Publication No. WO 2012/146357 and which claims the priority of German Patent Application, Serial No. 10 2011 018 958.0, filed Apr. 29, 2011, pursuant to 35 U.S.C. 119(a)-(d).

BACKGROUND OF THE INVENTION

The invention relates to a method for operating a combustion engine with charging and charge air cooling. The invention also relates to a combustion engine with at least one compressor and at least one charge air cooler downstream of the compressor.

Charging or motor charging relates to the delivery of compressed charge air to the combustion chamber of a combustion engine in order to increase the performance and/or the efficiency of this combustion engine. The compression is usually accomplished by at least one supercharger which can be a turbo charger a compressor or the like. The combustion chamber includes one or multiple cylinders. The charge air can be fresh air or an air mixture (for example fuel air mixture or exhaust gas air mixture).

Charge air cooling relates to the cooling down of the compressed charge air after compression, which allows further increasing the performance and/or the efficiency of the combustion engine, as is known. The charge air cooling is usually accomplished by at least one charge air cooler, which can be a heat exchanger which is integrated in the induction tract of the combustion engine between the compressor and the inlet into the combustion chamber.

SUMMARY OF THE INVENTION

A problem is that under certain conditions the temperature of the charge air in the charge air cooler is lowered to the degree so as to result in an oversaturated state which may cause condensate or condensation water and/or even ice to form in the charge air cooler and/or in the induction tract which is downstream in the direction of flow of the charge air volume flow.

In order to prevent this, a bypass, which is parallel to the charge air cooler is proposed in GB 1 255 956. With this the charge air volume flow can be divided into a partial volume flow through the charge air cooler and a partial volume flow through the bypass. Uniting the cooled partial volume flow from the charge air cooler and the uncooled partial volume flow from the bypass is intended to prevent formation of condensation water. The partial volume flow through the bypass is adjusted by means of a bypass valve in dependence on the temperature of the charge air flow after uniting the partial volume flows. A similar proposal originates from DE 198 52 766 A1, wherein in this case the un-cooled partial volume flow from the bypass is at the same time used for heating the inner walling of a pipe leading to the inlet of the combustion chamber.

In order to counter the problem of the formation of condensation water it is proposed in AT 508 010 A4 to determine the humidity of the suctioned in fresh air prior to the compression by means of a humidity sensor and in dependence thereof to adjust the temperature of the compressed charge air, which is supplied to the combustion chamber, for example by means of an adjustable charge air cooler.

The goal of the above-mentioned measures is to avoid formation of condensation water and/or ice in the charge air cooler and/or in the following induction tract during normal operation of the combustion engine (condensation water avoidance). It is not disclosed however how to handle the already present condensation water and/or ice. Even with the measures known from the state of the art, formation of condensation water and/or ice cannot be reliably avoided. For example, condensation water can form in the charge air cooler and/or in the following induction tract during prolonged shutoff of the combustion engine, which can adversely affect the combustion process and/or can cause damage to the motor (water hammer).

The invention is therefore based on the object to provide a remedy for this circumstance.

This object is solved by a method for operating a combustion engine with charge and charge air cooling, including adjusting or changing over time a charge air volume flow through a charge air cooler by means of at least one charge air cooler valve in a critical operating state so that condensation water present in the charge air cooler and/or in an induction tract downstream of the charge air cooler is gradually fed in harmless amounts into a combustion chamber of the combustion engine and discharged The object is further solved by a combustion engine according to the invention with the features of the alternative independent claim. Preferred and advantageous embodiments and refinements are set forth in the respective dependent claims. The following explanations apply analogously for both inventive subject matters.

The method according to the invention for operating a combustion engine with charging and charge air cooling provides that in a critical operating state, the charge air flow through a charge air cooler is adjusted or changed over time by means of at least one charge air cooler valve so that condensation water present in the charge air cooler and/or in the following induction tract is supplied to the combustion chamber only in harmless amounts and thus discharged.

An idea of the invention is to discharge existing condensation water, which as mentioned above has typically accumulated in the charge air cooler and/or in the following induction tract, by gradual and controlled supply to the combustion chamber which can also be referred to as dosed discharge, without adversely affecting combustion. This also eliminates the risk of water hammer. The feeding of the condensation water into the combustion chamber is accomplished by the charge air volume flow through the charge air cooler, which has a carry-along effect on the condensation water. The charge air flow through the charge air cooler and with this the carry-along effect can be adjusted and/or changed over time by means of the charge air cooler valve thus enabling the dosed discharge. The same applies for condensation water in solid form or respectively for frozen condensation water (for example ice), wherein the ice is first successively thawed and discharged via the combustion chamber in the manner described above. The invention thus also enables a simplified use of direct charge air coolers, i.e. charge air coolers which are cooled with ambient air or the airstream, which are critical with regard to the formation of condensation water however overall less complex.

The measures according to the invention for the dosed discharge of the condensation water are only to be performed in critical operating states of the combustion engine. Critical operating states are such operating states in which condensation water and/or ice (attachment of frozen condensation water) forms or has formed in the charge air cooler and/or in the following induction tract. This can for example be determined or detected with corresponding sensors such as humidity sensors. However, critical operating states can also be operating states in which the formation of condensation water and/or ice is suspected (for example based on experience), is expected (for example based on model calculations and/or simulation) and/or cannot be safely excluded, wherein also in this case sensors such as temperature sensors can be used in a supporting manner. For the dosed discharge of condensation water, the combustion engine is operated in accordance with the method according to the invention, which for example is implemented by a control device. During this, the normal operation of the combustion engine is suspended or interrupted.

The presence of condensation water and/or ice is principally to be expected after prolonged shutoff of the combustion engine at cool ambient temperatures. Particularly critical is the prolonged shutoff of the combustion engine at ambient temperatures above 0° C. because in this case ice, which may be present in the charge air cooler and/or in the following induction tract and has formed in the prior operation of the combustion engine, gradually thaws. Extremely critical is the re-ignition of the combustion engine at ambient temperatures between 0° C. and 5° C., in particular after prolonged shutoff, because in this case condensation water (condensate deposition) can form and at the same time ice can thaw. Problematic is then the cold start phase which includes the first minutes after the start of the motor, wherein this cold start phase can be handled without risk by the method according to the invention.

It is in particular provided that for protecting the motor, the combustion engine is operated at each motor start Le, in the start phase and in particular at each cold start i.e., in the cold start phase in accordance with the method according to the invention. Critical operating states can be detected with sensors. It is also sufficient however when a critical operating state is suspected, is to be principally expected or cannot be safely excluded.

Depending on the actual setting of the charge air cooler valve, a decreased charge air flow through the charge air cooler can occur. In order to maintain a charge air volume flow that is optimal or required for the combustion, the charge air flow is preferably divided into a partial volume flow through the charge air cooler and a partial volume flow through the bypass which is parallel to the charge air cooler. As the case may be, a bypass, which is already arranged on the combustion engine, can be used so that no additional mounting space is required.

The partial volume flow through the charge air cooler can be adjusted and/or changed over time by means of the charge air cooler valve as described above. The partial volume flow through the bypass which is not cooled can be adjusted and/or changed over time separately by means of at least one bypass valve. Due to the separated but ideally coordinated adjustment and/or change over time of the partial volume flows, a very good discharge of the condensation water with minimal influence on the combustion process without endangering the combustion engine is achieved.

It is preferably provided that the charge air cooler valve and an optionally present bypass valve are controlled and/or regulated by a control device. The control device can in particular be the motor control unit for the combustion engine which is configured correspondingly.

The control or regulation of the charge air cooler valve and as the case may be the bypass can be based on the measurement values of at least one temperature sensor which is mounted in the charge air cooler and/or in the following induction tract. In this case the control or regulation preferably occurs by the control device which for this purpose uses the measurement values of the temperature sensor, and also predicts or can at least not exclude the presence of condensation water and/or ice by taking into account stored prior operating states of the combustion engine via a model calculation and/or simulation. Then, the control device can actuate the charge air valve and as the case may be the bypass valve correspondingly in order to discharge the condensation water via the combustion chamber in a dosed manner. Depending on the situation, it may also be the case that no condensation water and/or ice are present but nevertheless corresponding measures are initiated. For the protection of the motor this is beneficial however.

As an alternative or in addition it can be provided that the control or regulation of the charge air cooler valve and as the case may be the bypass valve is based on the measurement values of at least one humidity sensor which is mounted in the region of the charge air cooler or in the subsequent induction tract. Preferably also in this case it is provided that the control or adjustment occurs by the control device which for this purpose uses the measurement values of the humidity sensor and as the case may be detects the presence of condensate water and/or ice by means of a simplified model calculation and/or simulation. Then, the control device can correspondingly actuate the charge air cooler valve and as the case may be the bypass valve.

The combustion engine according to the invention has at least one compressor and at least one charge air cooler downstream of the compressor. The combustion engine according to the invention also has at least one charge air cooler valve with which the charge air flow through the charge air cooler can be adjusted and/or changed over time and a control device which controls or regulates the charge air cooler valve so that condensation water which is present in the charge air cooler and/or the following induction tract is fed successively into the combustion chamber only in harmless amounts and thus discharged. The combustion engine according to the invention can be operated with the method according to the invention.

The combustion engine according to the invention is preferably an internal combustion engine of a motor vehicle, which in particular operates according to the Otto or diesel principle. For the operation, liquid as well as gaseous fuels can be used wherein liquid fuels are preferably directly supplied into the combustion chamber with an injection system.

Preferably the combustion engine according to the invention has a bypass which is parallel to the charge air cooler and has at least one bypass valve so that the charge air volume flow can be divided into a partial volume flow through the charge air cooler and a partial volume flow through the bypass, wherein the partial volume flow through the bypass can be adjusted and/or changed over time separately by means of the bypass valve.

BRIEF DESCRIPTION OF THE DRAWING

The control device is preferably configured to control or to regulate the charge air cooler valve and as the case may be also the bypass valve based on the measuring values of at least one temperature sensor and/or humidity sensor as explained in more detail above. Ideally, the control or regulation of the charge air cooler valve and bypass valve are coordinated with one another in order to enable the dosed discharge of condensation water while maintaining an optimal or required charge air volume flow. The temperature sensor and/or the humidity sensor are positioned in the region of the charge air cooler, in particular directly downstream of the charge air cooler or in the following induction tract of the combustion engine.

The charge air volume flow can at least temporarily contain a re-circulated exhaust gas portion for which the combustion engine according to the invention can be equipped with an exhaust gas re-circulation or an exhaust gas re-circulation system. Exhaust gases typically are very moist which facilitates the formation of condensation water and/or ice in the charge air cooler and/or the downstream induction tract. The invention enables a more simple design of the exhaust gas recirculation because a possible formation of condensation water can be handled well with the invention and is thus less critical. Instead of a high pressure exhaust gas re-circulation (in which the re-circulated exhaust gas is fed into the already compressed charge air volume flow) a low pressure exhaust recirculation as the case may be can be used (in which the re-circulated gas is fed into the uncompressed charge air volume flow). With this, a recirculation cooler (AGR-cooler) is not required. Further, a permanent and not only temporary exhaust gas re-circulation is enabled which with regard to emission values is very advantageous regarding future threshold values.

Figure 1:
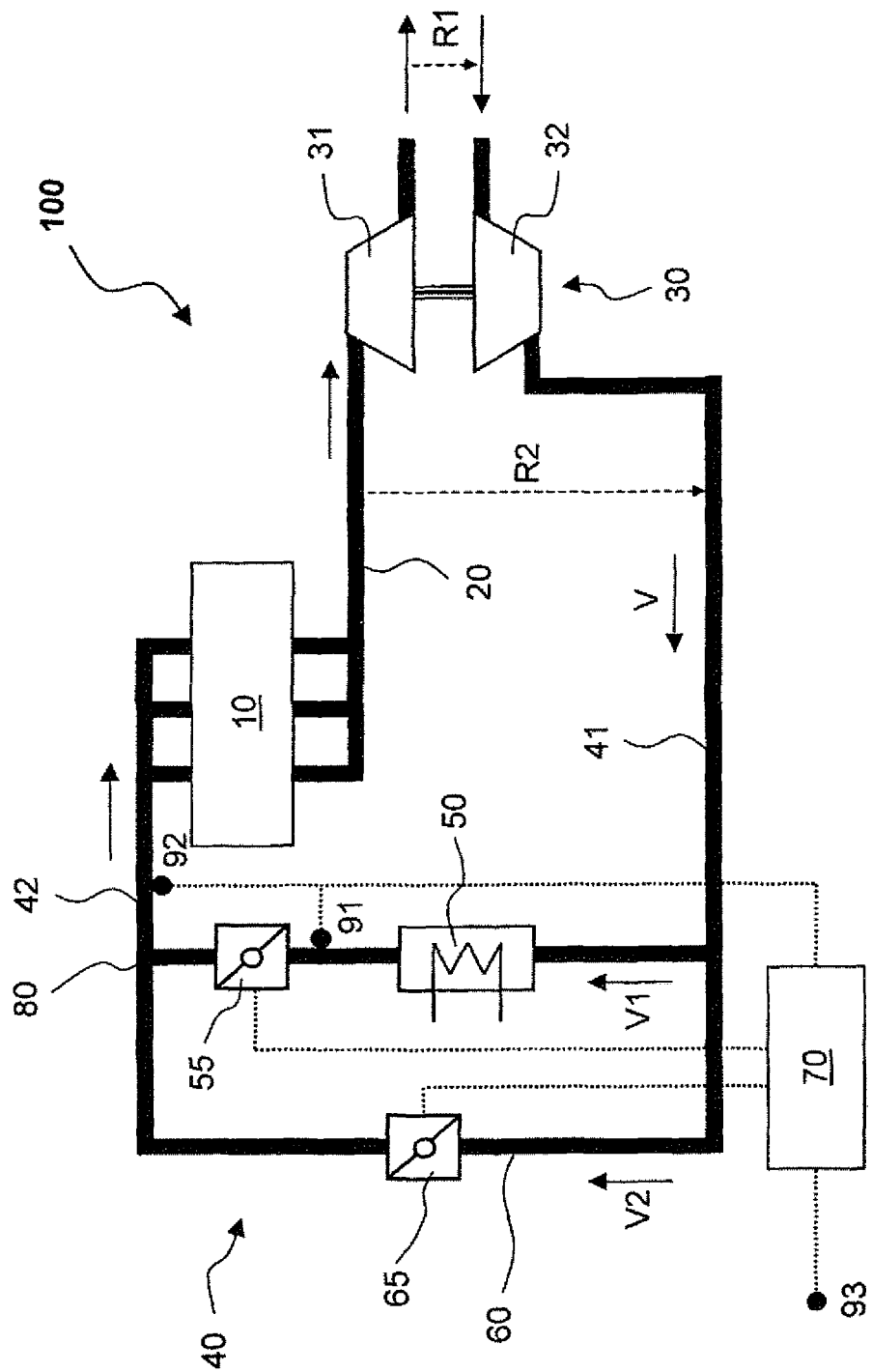

In the following, the invention is explained in an exemplary and not limiting manner with reference to the Figures.

FIG. 1 shows schematically a combustion engine according to the invention.

FIG. 2 shows a table with possible operating states of the combustion engine of FIG. 1.

DETAILED DESCRIPTION OF PREFERRED EMBODIMENTS

FIG. 1 shows a combustion engine 100, which has a combustion chamber 10 with multiple cylinders. In the exhaust duct 20, which leads away from the combustion chamber 10, a turbine 31 is located which belongs to a turbocharger 30 with a compressor 32. In the induction tract 40, which leads to the combustion chamber 10 is a charge air cooler 50 and a bypass 60 which is parallel to the charge air cooler 50. Via this induction tract 40, a charge air volume flow V is delivered to the combustion chamber 10 which volume flow is compressed by the compressor 32, wherein this can be fresh air or an exhaust gas-air mixture (fresh air with a proportion of re-circulated exhaust gas). The combustion engine 100 includes further an optional (switchable) exhaust gas recirculation R1 (low pressure exhaust gas re-circulation) and/or R2 (high pressure exhaust gas re-circulation). The section of the induction tract 40, which is located upstream of the charge air cooler 50, is designated with 41 and the section of the induction tract 40, which is located downstream of the charge air cooler 50, is designated 42. For the compression of the charge air volume flow V, a compressor or the like can be provided instead of the turbocharger 30.

The charge air volume flow V which flows through the induction tract 40 and is compressed by the compressor 32 is divided into a partial volume flow V1 through the charge air cooler 50 and a partial volume flow V2 through the bypass 60 depending on the operating state of the combustion engine, wherein the two partial volume flows V1 and V2 are united again at a merging point 80 and are supplied to the combustion chamber 10. Operating states are also provided in which the charge air volume flow V is only conducted through the charge air cooler 50 (V1=V) or only through the bypass 60 (V2=V).

For controlling or regulating the partial volume flow V1 through the charge air cooler 50, a charge air cooler valve 55 is arranged in the charge air cooler path. In the shown example the charge air cooler valve 55 is arranged downstream of the charge air cooler 50 relative to the flow-through direction. This charge air cooler valve 55 can be heated in order to ensure the functioning of this valve. As an alternative the charge air cooler valve 55 can also be arranged before the charge air cooler 50. For controlling or adjusting the partial volume flow V2 through the bypass 60 a bypass valve 65 is provided in the bypass path. The control or regulation of the charge air cooler valve 55 and the bypass valve 65 occurs by a control device 70.

During operation of the combustion engine 100, condensation water or even ice may form in the charge air cooler 50 and in the downstream induction tract 42, in particular when it is a direct charge air cooler 50. This is caused by over-saturation resulting from the cooling of the partial volume flow V1 in the charge air cooler 50 so that the water bound in the partial volume flow V1 (vapor) precipitates as condensate or condensation water. The amount of condensation water that forms depends on the conditions present in the partial volume flow V1 (among other things temperature, pressure and relative humidity). Particularly critical are conditions in the dew point range.

With regard to such a condensation water formation, a high relative humidity in the charge air volume flow or the partial volume flow V1 associated together with low temperatures which for example are between 0° C. and 5° C., is particularly critical in particular when the combustion engine is in a cold start phase because in this case strong condensation water formation can occur and at the same time ice that was formed in the previous operation of the combustion engine 100 can thaw or is already thawed.

By means of the temperature sensors 91, 92 and 93 the temperatures directly downstream of the charge air cooler 50, the temperature downstream of the merging point 80 and the ambient temperature can be measured. The measured values are communicated to the control device 70, which based on a model calculation, recognizes, expects or at least cannot exclude the presence of condensation water and/or ice, which corresponds to a critical operating state. Instead of the temperature sensors 91 and 92 or in addition to these temperature sensors, humidity sensor can also be used.

When a critical operating state is given, the normal operation of the combustion engine 100 is interrupted or suspended. Further, the charge air cooler valve 55 is partially or completely closed by the control device 70 and the bypass 60 is opened by complete or partial opening of the bypass valve 65. At least the condensation water that is present in the charge air cooler 50 and the condensation water that is present in the downstream induction tract (between the charge air cooler 50 and the merging point 80) is then not impulsively conducted into the combustion chamber 10 but successively in harmless amounts (dosed discharge). The settings of the charge air cooler valve 55 and the bypass valve 65 can be changed over time with as the discharge of the condensation water progresses, which can occur by closed or open loop control. When the discharge of the condensation water is finished the combustion engine returns to normal operation.

FIG. 2 shows in tabular form with simplified parameters possible operating states of the combustion engine 100, which are designated with A to F. The change between the different operating states is achieved by the control device 70 for example depending on the ambient temperature. The operating states A, C, D and F can be regarded as normal operating states of the combustion engine 100. The operating states B to E are critical operating states, which are handled according to the invention. The actuation of the charge air cooler valve 55 and the bypass valve 65 by the control device 70 in these critical operating states for the dosed discharge of condensation water and/or ice is designated in a non limiting manner with "regulation".

In the operating states C and F, which belong to the normal operation, the bypass valve 65 is at least partially opened and the charge air cooler valve 55 is at least partially closed in order to prevent formation of condensation water as mentioned above. When in this case the charge air cooler path is to be completely closed by the charge air cooler valve 55, significant amounts of condensation water and/or ice may nevertheless form in the charge air cooler 50 and/or in the downstream induction tract 42 as a result of leakages on the charge air cooler valve 55 and the resulting very low partial volume flow V1. Problematic is then the subsequent shutting off of the combustion engine 100 at ambient temperatures equal to or greater than 0° C. (as explained above).

Also the termination of the operating states C and F is problematic so that in this case a change to the operating sates B or E should occur for a defined period of time, which ideally is automatically triggered by the control device 70. This change to the operating sates B or E can occur necessarily and independent of the fact whether a detected condensation water and/or ice formation has actually occurred, wherein a critical operating state is assumed. Formation of condensation water and/or ice can however also be detected or determined with at least one humidity sensor which is additionally or as alternative is positioned to the temperature sensors 91 and/or 92.

What is claimed is:

1. A method for operating a combustion engine with charge and charge air cooling, comprising adjusting or changing over time a charge air volume flow through a charge air cooler by means of at least one charge air cooler valve in a critical operating state which is adjusted so that it does not prevent condensation from being formed and all condensation water present in at least one of the charge air cooler and an induction tract downstream of the charge air cooler is gradually successively fed not impulsively but in dosed discharge in harmless amounts into a combustion chamber of the combustion engine and discharged from the combustion chamber.

2. The method of claim 1, wherein the critical operating state of the combustion engine includes a cold start phase of the combustion engine.

3. The method of claim 2, further comprising dividing the charge air volume flow into a partial volume flow through the charge air cooler and a partial volume flow through a bypass, with the partial volume flow through the bypass being separately settable and/or changeable over time with at least one bypass valve.

4. The method of claim 3, wherein the charge air cooler valve and the bypass valve are controlled by open loop or closed loop control by a control device.

5. The method of claim 4, wherein the charge air cooler valve and optionally the bypass valve are controlled or regulated as a function of measuring values of at least one temperature sensor which is arranged in a region of the charge air cooler or in the downstream induction tract.

6. The method of claim 4, wherein the charge air cooler valve and optionally the bypass valve are controlled or regulated as a function of measuring values of at least one humidity sensor which is arranged in a region of the charge air cooler or in the downstream induction tract.

7. A combustion engine, comprising:
at least one compressor;
at least one charge air cooler downstream of the compressor, said at least one charge air cooler comprising a charge air cooler valve configured for at least one of setting and changing over time a charge air volume flow through the charge air cooler; and
a control device constructed to control or regulate the charge air cooler valve which is adjusted so that it does not prevent condensation from being formed and condensation water present in the charge air cooler or in an induction tract downstream of the charge air cooler is all successively fed not impulsively but in dosed discharge into the combustion chamber in harmless amounts and discharged from the combustion chamber.

8. The combustion engine of claim 7, further comprising a bypass parallel to the charge air cooler, said bypass having at least one bypass valve for dividing the charge air volume flow into a partial volume flow through the charge air cooler and a partial volume flow through the bypass, with the partial volume flow through the bypass being separately settable or changeable or both over time by means of the bypass valve.

9. The combustion engine of claim 7 wherein the control device is configured to control or adjust the charge air cooler valve and optionally the bypass valve as a function of measuring values of at least one temperature sensor or humidity sensor or both.

10. The combustion engine of claim 7, further comprising an exhaust gas recirculation system causing the charge air volume flow to at least temporarily contain a proportion of re-circulated exhaust gas.

\* \* \* \* \*